(12) United States Patent
Wang et al.

(10) Patent No.: US 11,128,349 B2
(45) Date of Patent: Sep. 21, 2021

(54) COMMUNICATION METHOD, COMMUNICATIONS APPARATUS, NETWORK DEVICE, AND TERMINAL

(71) Applicant: HUAWEI TECHNOLOGIES CO., LTD., Guangdong (CN)

(72) Inventors: Ting Wang, Shanghai (CN); Shengyue Dou, Shanghai (CN); Yuanjie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/288,823

(22) Filed: Feb. 28, 2019

(65) Prior Publication Data
US 2019/0199406 A1 Jun. 27, 2019

Related U.S. Application Data

(63) Continuation of application No. PCT/CN2017/109383, filed on Nov. 3, 2017.

(30) Foreign Application Priority Data

Nov. 4, 2016 (CN) .......................... 201610981779.9

(51) Int. Cl.
*H04B 7/024* (2017.01)
*H04W 72/04* (2009.01)
*H04L 25/02* (2006.01)
*H04B 7/06* (2006.01)

(52) U.S. Cl.
CPC ........... *H04B 7/024* (2013.01); *H04B 7/0617* (2013.01); *H04L 25/02* (2013.01); *H04L 25/0224* (2013.01); *H04W 72/042* (2013.01)

(58) Field of Classification Search
CPC ... H04B 7/024; H04B 7/0617; H04L 25/0224; H04L 25/02; H04W 72/042; H04W 72/046
See application file for complete search history.

(56) References Cited

U.S. PATENT DOCUMENTS

2014/0119266 A1 5/2014 Ng et al.
2015/0208392 A1* 7/2015 Park ...................... H04B 7/024
370/329

(Continued)

FOREIGN PATENT DOCUMENTS

CN 104770039 A 7/2015
CN 105103466 A 11/2015
(Continued)

OTHER PUBLICATIONS

R1-1608675 ZTE Corporation,"On Qusai-Co-Location/Beam for NR MIMO",3GPP TSG RAN WG1 Meeting #86bis, Lisbon, Portugal, Oct. 10-14, 2016,total 6 pages.

(Continued)

*Primary Examiner* — Syed Haider
(74) *Attorney, Agent, or Firm* — Leydig, Voit & Mayer, Ltd.

(57) ABSTRACT

This application discloses a communication method, a communications apparatus, a network device, and a terminal. Quasi co-location QCL beam information is determined. The QCL beam information includes beam information that has a QCL relationship with a reference signal antenna port. The QCL beam information is sent. A terminal receives the QCL beam information. The QCL beam information includes the beam information that has the QCL relationship with the reference signal antenna port. The terminal determines, based on the beam information that is included in the QCL beam information and that has the QCL relationship with the reference signal antenna port, a beam that has the QCL relationship with the reference signal antenna port.

21 Claims, 6 Drawing Sheets

(56) References Cited

U.S. PATENT DOCUMENTS

| | | | |
|---|---|---|---|
| 2016/0056941 A1 | 2/2016 | Kang et al. | |
| 2016/0142189 A1 | 5/2016 | Shin et al. | |
| 2017/0325260 A1* | 11/2017 | Guo | H04W 72/0453 |
| 2018/0054797 A1* | 2/2018 | Islam | H04B 7/0617 |
| 2018/0083680 A1* | 3/2018 | Guo | H04B 7/0626 |
| 2018/0103407 A1* | 4/2018 | Nagaraja | H04W 72/044 |
| 2018/0287681 A1* | 10/2018 | Chen | H04L 5/0057 |
| 2019/0110220 A1 | 4/2019 | Park et al. | |

FOREIGN PATENT DOCUMENTS

| | | |
|---|---|---|
| JP | 2015164281 A | 9/2015 |
| WO | 2015182915 A1 | 12/2015 |
| WO | 2017050033 A1 | 3/2017 |

OTHER PUBLICATIONS

R1-1609256 LG Electronics,"Discussion on beam coordination and QCL for NR",3GPP TSG RAN WG1 Meeting #86bis,Lisbon, Portugal Oct. 10-14, 2016,total 5 pages.

3GPP TS 36.213 V14.0.0 (Sep. 2016),3rd Generation Partnership Project;Technical Specification Group Radio Access Network;Evolved Universal Terrestrial Radio Access (E-UTRA);Physical layer procedures(Release 14),total 406 pages.

3GPP TS 36.211 V13.2.0 (Jun. 2016),3rd Generation Partnership Project;Technical Specification Group Radio Access Network;Evolved Universal Terrestrial Radio Access (E-UTRA);Physical channels and modulation(Release 13),total 168 pages.

R1-166563 Intel Corporation,"On the need of new QCL parameters in NR",3GPP TSG RAN WG1 Meeting #86, Gothenburg, Sweden, Aug. 22-26, 2016,total 4 pages.

R1-166903 LG Electronics,"Discussion on transmit beam coordination and QCL for NR",3GPP TSG RAN WG1 Meeting #86,Gothenburg, Sweden Aug. 22-26, 2016,total 5 pages.

R1-1610275 Nokia et al.,"Extended framework for QCL assumptions",3GPP TSG-RAN WG1#86bis,Lisbon, Portugal, Oct. 10-14, 2016,total 3 pages.

R1-1609525 Intel Corporation,"On QCL to support UE beam management",3GPP TSG RAN WG1 Meeting #86bis, Lisbon, Portugal Oct. 10-14, 2016,total 4 pages.

Convida Wireless: "Synchronization on Beamforming Initial Access Operations",3GPP Draft;R1-1610372, Oct. 9, 2016. total 3 pages.

* cited by examiner

COMMUNICATION METHOD, COMMUNICATIONS APPARATUS, NETWORK DEVICE, AND TERMINAL

CROSS-REFERENCE TO RELATED APPLICATIONS

This application is a continuation of International Application No. PCT/CN2017/109383, filed on Nov. 3, 2017, which claims priority to Chinese Patent Application No. 201610981779.9, filed on Nov. 4, 2016, the disclosure of which is hereby incorporated by reference in its entirety.

TECHNICAL FIELD

This application relates to the field of communications technologies, and in particular, to a communication method, a communications apparatus, a network device, and a terminal.

BACKGROUND

Popularization of devices such as an intelligent mobile terminal in recent years imposes a higher requirement on a system throughput. In a case of increasingly strained spectrum resources, a communication mode supporting coordinated multipoint transmission/reception (CoMP) emerges.

In the CoMP communication mode, signals may come from a plurality of different transmission points (TRP). To ensure correct receiving and demodulation of the signals, a concept of a reference signal that has a quasi co-location (QCL) relationship is introduced, for example, a cell-specific reference signal (CRS) or a channel state information-reference signal (CSI-RS). A terminal may estimate a large-scale property parameter based on the CRS/CSI-RS. The large-scale property parameter includes one or more of a delay spread, a Doppler spread, a Doppler frequency shift, an average channel gain, and an average delay. For example, in a protocol Release 11 of a Long Term Evolution (LTE) communications system, antenna port QCL is introduced to support CoMP. The antenna port QCL indicates that signals sent by antenna ports go through same large-scale fading, and have a same large-scale property parameter. For example, when a QCL relationship exists between an antenna port A and an antenna port B, a large-scale channel property parameter estimated by using a signal on the antenna port A is also applicable to a signal on the antenna port B.

In the LTE system, to support a terminal receiving a physical downlink control channel (PDCCH) from a serving base station, and receiving a physical downlink shared channel (PDSCH) from a coordinated base station, a new transmission mode (transmission mode 10) is defined in R11. A physical downlink shared channel resource element mapping and quasi co-location indicator (PQI) is introduced, to indicate the base station sending the PDSCH, and to indicate an antenna port that is consistent with a large-scale channel property corresponding to the PDSCH. In the LTE system, for a same TRP, there is a QCL relationship between all ports for a demodulation reference signal (DMRS) corresponding to the PDSCH received by the terminal, that is, there is a quasi co-location relationship between an antenna port 7 to an antenna port 14. Therefore, the terminal may learn of, based on the PQI with reference to PDSCH resource element mapping and QCL configuration information of radio resource control (RRC) configuration, a radio channel parameter corresponding to the DMRS that needs to be used to demodulate the PDSCH.

However, in a 5th Generation communications system, a large-scale array structure of a plurality of antenna panels may be configured in a same TRP, and different beams formed by different antenna panels have different large-scale properties (in addition to a delay spread, a Doppler spread, a Doppler frequency shift, an average channel gain, and an average delay, the large-scale property further includes an angle of arrival (AOA), an angle of arrival spread (AAS), an angle of departure (AOD), an angle of departure spread (ADS), a spatial correlation (spatial correlation), and the like). Therefore, for a same TRP, there may be no QCL relationship between antenna ports for sending signals. As a result, when the QCL information is configured based on the PQI indicator, the terminal cannot estimate a large-scale property parameter based on the information. Different large-scale property parameters of different beams may indicate that one or more of the large-scale property parameters is/are different.

Therefore, how to provide a QCL information configuration method applicable to the 5G communications system is an urgent problem to be resolved.

SUMMARY

Embodiments of this application provide a communication method and a communications apparatus, to be specific, provide a quasi co-location information sending and receiving method and apparatus, a network device, and a terminal, so that the terminal can determine a beam that has a QCL relationship with a reference signal antenna port, and accurately perform large-scale channel property estimation.

According to a first aspect, a QCL information sending and receiving method is provided. In the method, a network device sends determined QCL beam information to a terminal. The QCL beam information includes beam information that has a QCL relationship with a reference signal antenna port. After receiving the QCL beam information, the terminal may determine, based on the beam information that is included in QCL indication information and that has the QCL relationship with the reference signal antenna port, a beam that has the QCL relationship with the reference signal antenna port, further determine a sent reference signal that is sent through the beam, and perform large-scale channel property estimation based on the determined sent reference signal.

The reference signal may be a demodulation reference signal, a channel state information-reference signal, or another reference signal. This is not limited herein. The QCL beam information may be a beam identifier, beam antenna port information, or other beam-related information. Beam identifier information may be a beam synchronization signal identifier. The beam may include a transmit beam and a receive beam. The transmit beam indicates distribution of signal strength formed in different directions in space after a signal is transmitted via an antenna. The receive beam indicates distribution of signal strength, of a wireless signal received from an antenna, in different directions in space. The beam may be a beam-related signal such as a reference signal for beam scanning, a beam reference signal, a reference signal for beam scanning, or a beam synchronization signal. Optionally, the determined beam that has the QCL relationship with the reference signal antenna port may be a physical beam, or the beam-related signal such as the reference signal for beam scanning, the beam reference signal, the reference signal for beam scanning, or the beam synchronization signal mentioned above. Further, the sent reference signal that is sent through the beam may be one or more of beam-related signals such as a reference signal for beam scanning, a beam reference signal, a reference signal for beam scanning, or a beam synchronization signal that is sent through the physical beam, or may be one or more of beam-related signals such as a reference signal for beam scanning, a beam reference signal, a reference signal for beam scanning, or a beam synchronization signal that is corresponding to the beam information.

In a possible design, the network device sends the QCL beam information through radio resource control RRC signaling.

The QCL beam information includes at least one group of QCL beam information. The network device sends the at least one group of QCL beam information to the terminal through the RRC signaling, and indicates, through downlink control information, QCL beam information applicable to a reference signal currently used by the terminal. The QCL beam information applicable to the currently used reference signal is the beam information that has the QCL relationship with the reference signal antenna port.

In this embodiment of this application, adding the QCL beam information to original QCL indication information in the RRC signaling may be implemented in the following two manners:

In a first implementation, the QCL beam information is added to data resource mapping and QCL configuration information, so that parameter information used to indicate that the QCL beam information is added to the RRC signaling is added to a physical layer protocol.

In another implementation, the QCL beam information is added to a non-zero power CSI-RS configuration parameter, to indicate QCL beam information of a CSI-RS.

In another possible design, if the reference signal is a DMRS, QCL beam information that has a QCL relationship with a DMRS antenna port is QCL beam information included in CSI-RS resource configuration information corresponding to non-zero power CSI-RS configuration parameter identifier.

In still another possible design, the network device may determine, based on a time domain resource and/or a frequency domain resource used for sending a reference signal through the reference signal antenna port, the QCL beam information that has the QCL relationship with the reference signal antenna port on the time domain resource and/or the frequency domain resource, and send, to the terminal, the QCL beam information that has the QCL relationship with the reference signal antenna port on the time domain resource and/or the frequency domain resource.

The network device may send at least one of a time domain QCL beam information list, a frequency domain QCL beam information list, and a time-frequency domain QCL beam information list to the terminal. After receiving the frequency domain QCL beam information list from the network device, the terminal may determine QCL beams of the reference signal on different frequency bands, and perform large-scale channel property estimation on the different frequency bands. After receiving the time domain QCL beam information list from the network device, the terminal may determine QCL beams of the reference signal in different subframes, timeslots, or other time units, and then perform large-scale channel property estimation in the different subframes, timeslots, or other time units. After receiving the time-frequency domain QCL beam information list from the network device, the terminal may determine QCL beams of the reference signal on different time-frequency domain resources, and then perform large-scale channel property estimation in different time-frequency domains.

In still another possible design, the network device may send the QCL beam information through DCI.

The QCL beam information sent by the network device through the DCI may be beam information that has a QCL relationship with a reference signal antenna port currently used by the terminal for transmitting data. After the terminal sends the DCI to the terminal, the terminal may accurately determine, based on the received DCI, a beam that has the QCL relationship with the reference signal antenna port currently used for transmitting data and a sent reference signal sent by the determined beam, to perform large-scale channel property estimation based on the determined sent reference signal. For example, a large-scale property of the reference signal antenna port may be determined based on the determined beam that has the QCL relationship with the reference signal antenna port.

According to a second aspect, a communications apparatus is provided. The communications apparatus has a function of implementing the network device in the first aspect. The function may be implemented by hardware, or may be implemented by hardware executing corresponding software. The hardware or software includes one or more modules corresponding to the foregoing function. The module may be software and/or hardware.

In a possible design, the communications apparatus includes a processing unit and a sending unit, and functions of the processing unit and the sending unit may be corresponding to the method steps. Details are not described herein again.

According to a third aspect, a communications apparatus is provided. The quasi co-location information receiving device has a function of implementing the terminal in the first aspect. The function may be implemented by hardware, or may be implemented by hardware executing corresponding software. The hardware or software includes one or more modules corresponding to the foregoing function. The module may be software and/or hardware.

In a possible design, the communications apparatus includes a receiving unit and a processing unit, and functions of the receiving unit and the processing unit may be corresponding to the method steps. Details are not described herein again.

According to a fourth aspect, a network device is provided, and the network device includes a processor, a memory, and a transceiver.

The memory is configured to store an instruction. The processor is configured to execute the instruction stored in the memory to control the transceiver to receive and send signals. When the processor executes the instruction stored in the memory, the network device is configured to perform any method related to the network device in the first aspect.

According to a fifth aspect, a terminal is provided, and the terminal includes a processor, a memory, and a transceiver.

The memory is configured to store an instruction. The processor is configured to execute the instruction stored in the memory to control the transceiver to receive and send signals. When the processor executes the instruction stored in the memory, the terminal is configured to perform any method related to the terminal in the first aspect.

According to a sixth aspect, a computer storage medium is provided, and the computer storage medium is configured to store some instructions. When the instructions are executed, any method related to the foregoing terminal or network device may be performed.

According to a seventh aspect, a communications system is provided, and the communications system includes a terminal and a network device. The network device is the network device in the fourth aspect, and the terminal is the terminal in the fifth aspect.

The network device provided in this application has a function of implementing an action of the network device in the foregoing method aspect, and includes a corresponding means (means) configured to perform the steps or functions described in the foregoing method aspect. The steps or functions may be implemented by software, hardware, or a combination of hardware and software.

In a possible design, the network device includes one or more processors, and the one or more processors are configured to support the network device performing a corresponding function in the foregoing method. Optionally, the network device may further include one or more memories. The memory is configured to couple with the processor, and store a program and/or an instruction that are necessary for the network device, and may further store data. The one or more memories may be integrated with the processor, or may be separated from the processor. When the processor executes the program and/or the instruction in the memory, the network device performs a corresponding step in the foregoing method.

In a possible design, the network device includes one or more processors and a communications unit. The one or more processors are configured to support the network device implementing a corresponding function in the foregoing method, for example, determining QCL beam information. The communications unit is configured to support communication between the network device and another device, so as to implement a receiving and/or sending function, for example, sending the QCL beam information generated by the processor.

Optionally, the network device may further include one or more memories. The memory is configured to couple with the processor, and store a program instruction and/or data necessary for the network device. The one or more memories may be integrated with the processor, or may be separated from the processor. This is not limited in this application.

The network device may be a base station, a gNB, a TRP, or the like, and the communications unit may be a transceiver or a transceiver circuit. Optionally, the transceiver may be an input/output circuit or interface.

The network device may be a communications chip. The communications unit may be an input/output circuit or interface of the communications chip.

This application further provides an apparatus, and the apparatus has a function of implementing an action of the terminal in the foregoing method aspect, and includes a corresponding means configured to perform the steps or functions described in the foregoing method aspect. The steps or functions may be implemented by software, hardware, or a combination of hardware and software.

In a possible design, the apparatus includes one or more processors, and the one or more processors are configured to support the apparatus performing a corresponding function of the terminal in the foregoing method. Optionally, the apparatus may further include one or more memories. The memory is configured to couple with the processor, and store a program and/or an instruction that are necessary for the apparatus, and may further store data. The one or more memories may be integrated with the processor, or may be separated from the processor. When the processor executes the program and/or the instruction in the memory, the apparatus performs a corresponding step in the foregoing method.

In a possible design, the apparatus includes one or more processors and a communications unit. The one or more processors are configured to support the apparatus implementing a corresponding function of the terminal in the foregoing method, for example, determining a beam that has a QCL relationship with a reference signal antenna port. The communications unit is configured to support communication between the apparatus and another device, so as to implement a receiving and/or sending function, for example, receiving QCL beam information.

Optionally, the apparatus may further include one or more memories. The memory is configured to couple with the processor, and store a program instruction and/or data necessary for the apparatus. The one or more memories may be integrated with the processor, or may be separated from the processor. This is not limited in this application.

The apparatus may be an intelligent terminal, a wearable device, or the like, and the communications unit may be a transceiver or a transceiver circuit. Optionally, the transceiver may be an input/output circuit or interface.

The apparatus may be a communications chip. The communications unit may be an input/output circuit or interface of the communications chip.

In the embodiments of this application, the network device sends the determined QCL beam information to the terminal. The QCL beam information includes the beam information that has the QCL relationship with the reference signal antenna port. After receiving the QCL beam information, the terminal may determine, based on the beam information that is included in the QCL indication information and that has the QCL relationship with the reference signal antenna port, the beam that has the QCL relationship with the reference signal antenna port, further determine the sent reference signal that is sent through the beam, and perform large-scale channel property estimation based on the determined sent reference signal.

DESCRIPTION OF EMBODIMENTS

Figure 1A:
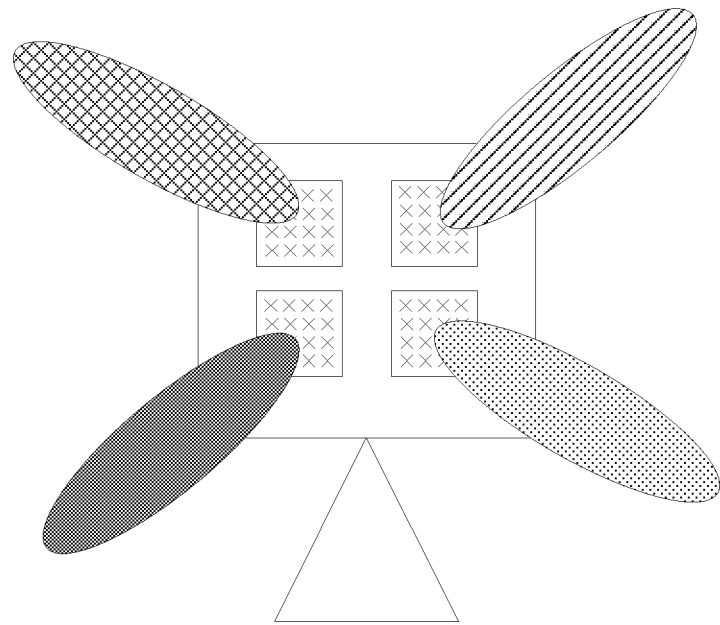
FIG. 1A and FIG. 1B are schematic diagrams of beams formed by four antenna panels included in one TRP according to an embodiment of this application.

The following describes the technical solutions in the embodiments of this application with reference to the accompanying drawings in the embodiments of this application.

Some terms in this application are first explained to facilitate understanding by a person skilled in the art.

(1) A network device may be referred to as a radio access network (RAN) device, which is a device that connects a terminal to a wireless network, and includes but is not limited to an evolved NodeB (eNB), a radio network controller (RNC), a NodeB (NB), a base station controller (BSC), a base transceiver station (BTS), a home eNodeB (for example, a Home evolved NodeB, or a Home NodeB, HNB), a baseband unit (BBU), a Wireless Fidelity (WiFi) access point (AP), a transmission point (transmission and receiver point, TRP or transmission point, TP), and the like. For example, the network device may be a gNB, a baseband unit (BBU), or a data unit (DU) in a 5G system such as an NR (new radio) system. In some deployments, the gNB may include a control unit (CU) and a DU, and may further include an RU (radio unit). The CU implements some functions of the gNB, and the DU implements some functions of the gNB. For example, the CU implements functions of an RRC (radio resource control) layer and a PDCP (packet data convergence protocol) layer, and the DU implements functions of an RLC (radio link control) layer, a MAC (media access control) layer, and a PHY (physical) layer. Information at the RRC layer eventually becomes information at the PHY layer, or is converted from the information at the PHY layer. Therefore, in this architecture, higher layer signaling such as RRC layer signaling or PHCP layer signaling may also be considered to be sent by the DU or by the DU and the RU.

(2) A terminal is a device that provides voice and/or data connectivity to a user, and may include various handheld devices, in-vehicle devices, wearable devices, or computing devices that have a wireless communication function, or another processing device connected to a wireless modem, and user equipment (UE), a mobile station (MS), terminal equipment, and a transmission point (transmission and receiver point, TRP or transmission point, TP) that are in various forms.

(3) Interaction in this application is a process in which information is transferred between two interaction parties, and information transferred herein may be the same or may be different. For example, the two interaction parties are a base station 1 and a base station 2, the base station 1 may request information from the base station 2, and the base station 2 provides the base station 1 with the information requested by the base station 1. Certainly, the base station 1 and the base station 2 may request information from each other, and the information requested herein may be the same or may be different.

(4) "A plurality of" means two or more than two. The term "and/or" describes an association relationship for describing associated objects, and represents that three relationships may exist. For example, A and/or B may represent the following three cases: Only A exists, both A and B exist, and only B exists. The character "/" generally indicates an "or" relationship between the associated objects.

(5) Nouns "network" and "system" are usually interchangeably used, but a meaning of which may be understood by a person skilled in the art. "Information", "signal", "message", and "channel" may be interchangeably used sometimes. It should be noted that expressed meanings are consistent when differences are not emphasized. "Of", "corresponding or relevant", and "corresponding" may be interchangeably used sometimes. It should be noted that expressed meanings are consistent when differences are not emphasized.

A quasi co-location information configuration method, a network device, and a terminal that are provided in the embodiments of this application may be applied to a new radio (NR) communications technology. The NR is a new-generation radio access network technology, and may be applied to a future evolved network such as a 5G communications system. Alternatively, the quasi co-location information configuration method, the network device, and the terminal that are provided in the embodiments of this application may be applied to a wireless communications system such as Wireless Fidelity (WIFI) or LTE, and may also be applied to a wired network such as a fixed network.

It may be understood that the wireless communications system is a network that provides a wireless communication function. The wireless communications system may use different communications technologies, for example, Code Division Multiple Access (CDMA), Wideband Code Division Multiple Access (WCDMA), Time Division Multiple Access (TDMA), Frequency Division Multiple Access (FDMA), orthogonal frequency division multiple access (OFDMA), single carrier frequency division multiple access (SC-FDMA), and carrier sense multiple access with collision avoidance. Based on factors such as capacities, rates, and delays of different networks, networks may be classified into a 2G (English: generation) network, a 3G network, a 4G network, and a future evolved network such as a 5G network. A typical 2G network includes a Global system for mobile communications (GSM) network or a general packet radio service (GPRS) network. A typical 3G network includes a Universal Mobile Telecommunications System (UMTS) network. A typical 4G network includes a Long Term Evolution (LTE) network. The UMTS network sometimes may also be referred to as a universal terrestrial radio access network (UTRAN), and the LTE network sometimes may also be referred to as an evolved universal terrestrial radio access network (E-UTRAN). Based on different resource allocation manners, the networks may be classified into a cellular communications network and a wireless local area network (WLAN). The cellular communications network is based on scheduling, and the WLAN is based on contention. All the foregoing 2G, 3G, and 4G networks are cellular communications networks. A person skilled in the art should know that, with development of technologies, the technical solutions provided in the embodiments of this application may also be applied to another wireless communications network such as a 4.5G or 5G network, or another non-cellular communications network. For brevity, the wireless communications network sometimes is referred to as a network for short in the embodiments of this application.

The cellular communications network is one of wireless communications networks. The cellular communications network uses a cellular wireless networking manner, and connects a terminal device to a network device via a radio channel, to implement mutual communication between moving users. The cellular communications network has a main property of mobility of the terminal, and has functions of inter-cell handover and automatic roaming across a local network.

An optional way in which the technical solutions are applied to the 5G communications system is used for description in the following embodiments of this application. It should be noted that the solutions in the embodiments of this application may be further applied to another wireless communications network, and a corresponding name may also be replaced with a name of a corresponding function in the another wireless communications network.

Figure 1B:
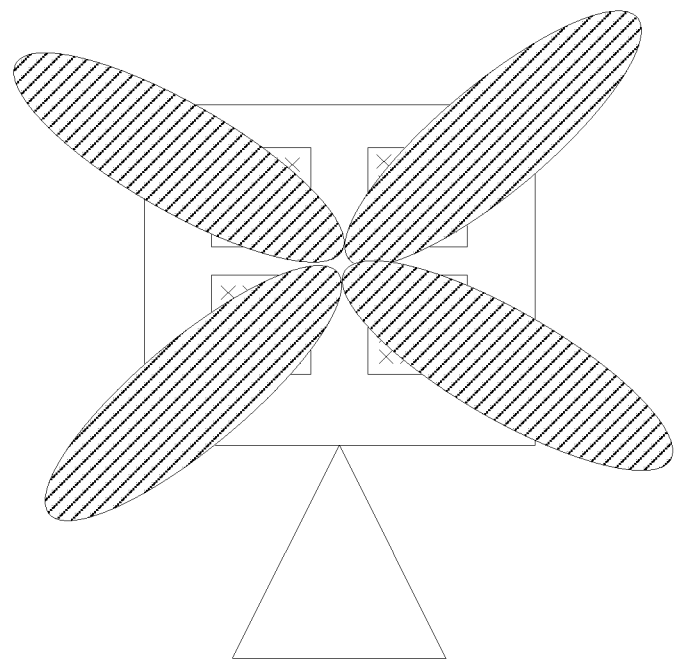

In the 5G communications system, a large-scale array structure of a plurality of antenna panels may be configured in a same TRP, and different antenna panels form a plurality of beams for sending signals. Therefore, different beams for sending signals have different channel properties. This leads to different QCL properties corresponding to a same antenna port number. When beams are different, a network device may send signals on a same antenna port with the same number, and the network device may send different beam signals for different beams. The beam signal may be a reference signal for beam scanning, a beam reference signal, a reference signal for beam scanning, a beam synchronization signal, or the like. Therefore, in the 5G communications system with a plurality of antenna panels, if an existing antenna port QCL relationship indication manner is still used, a sent signal that has a QCL relationship with a signal that is being sent at a current moment cannot be accurately indicated, and a large-scale property of the signal that is being sent at the current moment cannot be accurately determined. For example, FIG. 1A and FIG. 1B are schematic diagrams of beams formed by four antenna panels included in one TRP. In FIG. 1A, each of the four antenna panels independently forms a beam, each antenna panel forms a different beam, and there may be no QCL relationship between antenna ports for sending signals through the four different beams. In FIG. 1B, four antenna panels form beams together, but different precoding is performed on the beams formed by the four antenna panels, and therefore, the beams have different directions. In this case, there may be no QCL relationship between antenna ports for sending signals.

An embodiment of this application provides a QCL information configuration method. In the method, a network device sends determined QCL beam information to a terminal. The QCL beam information includes beam information that has a QCL relationship with a reference signal antenna port. After receiving the QCL beam information, the terminal may determine, based on the beam information that is included in QCL indication information and that has the QCL relationship with the reference signal antenna port, a beam that has the QCL relationship with the reference signal antenna port, further determine a sent reference signal that is sent through the beam, and perform large-scale channel property estimation based on the determined sent reference signal. The large-scale property may be one or more of a delay spread, a Doppler spread, a Doppler frequency shift, an average channel gain, an average, an angle of arrival, an angle of arrival spread (AAS), an angle of departure (AOD), an angle of departure spread (ADS), a spatial RX parameter, a spatial reception parameter (spatial RX parameters), and a spatial correlation.

It should be noted that the reference signal in this embodiment of this application includes but is not limited to a demodulation reference signal (DMRS), a channel state information-reference signal (CSI-RS), or other reference information. This is not limited herein.

It may be understood that the beam in this embodiment of this application is a beam formed by performing amplitude and/or phase weighting on data transmitted or received by at least one antenna port, or may be formed by using another method, for example, adjusting a related parameter of an antenna unit. The beam may include a transmit beam and a receive beam. The transmit beam indicates distribution of signal strength formed in different directions in space after a signal is transmitted through an antenna. The receive beam indicates distribution of signal strength that is of a wireless signal received from an antenna and that is in different directions in space. Signal processing at a receive end may be performing weighted combination on signals received by a multi-antenna array element, to form a wanted signal. From a perspective of an antenna directivity pattern, such operation is equivalent to forming a beam in a specified direction. For example, an original all-round receive directivity pattern is converted into a lobe directivity pattern with a zero point and a direction having a maximum signal strength. A same principle is also applicable to a transmit end. Amplitude and phase adjustment are performed on feed of an antenna array element, to form a directivity pattern with a wanted shape. Because a plurality of groups of antennas are used, wireless signals that correspond to a same spatial flow (spatial streams) are transmitted from the transmit end to the receive end through a plurality of paths. When signals received by a plurality of antennas are processed at the receive end by using a specific algorithm, a signal-to-noise ratio at the receive end may be obviously improved. Even when the receive end is far away, relatively good signal quality can be obtained.

The beam in this embodiment of this application may be a reference signal for beam scanning, a beam reference signal, a reference signal for beam scanning, or a beam synchronization signal.

It should be noted that the method or apparatus in the embodiments of this application may be applied to communication between a network device and a terminal (for example, a base station and user equipment), or between a network device and a network device (for example, between a macro base station and a micro base station, between a macro base station and a micro base station, or between a micro base station and a micro base station), or between a terminal device and a terminal device (for example, a device-to-device (D2D) scenario). In other words, a QCL information sending and receiving method in the embodiments of this application is not only applicable to QCL indication information of a beam in signal transmission, but also applicable to QCL indication information of a beam in signal receiving. In all the following embodiments of this application, communication between a network device and a terminal is used as an optional way for description.

Figure 2:
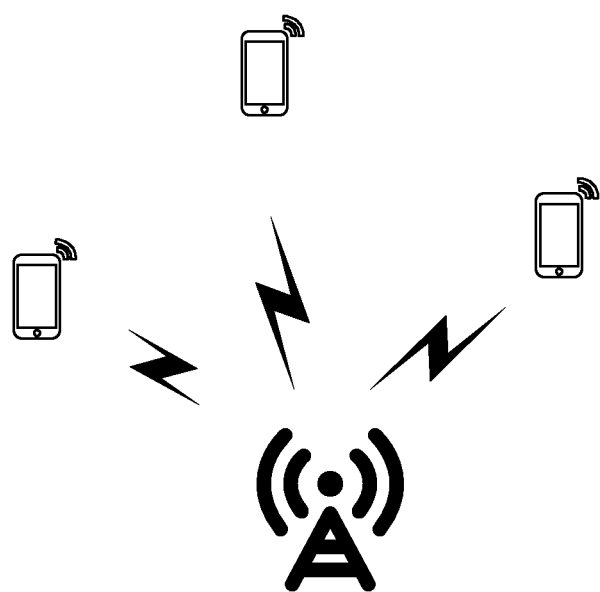
FIG. 2 is a schematic diagram of communication between a network device and a terminal.

FIG. 2 is a schematic structural diagram of a communications system that includes a network device and a terminal.

Figure 3:
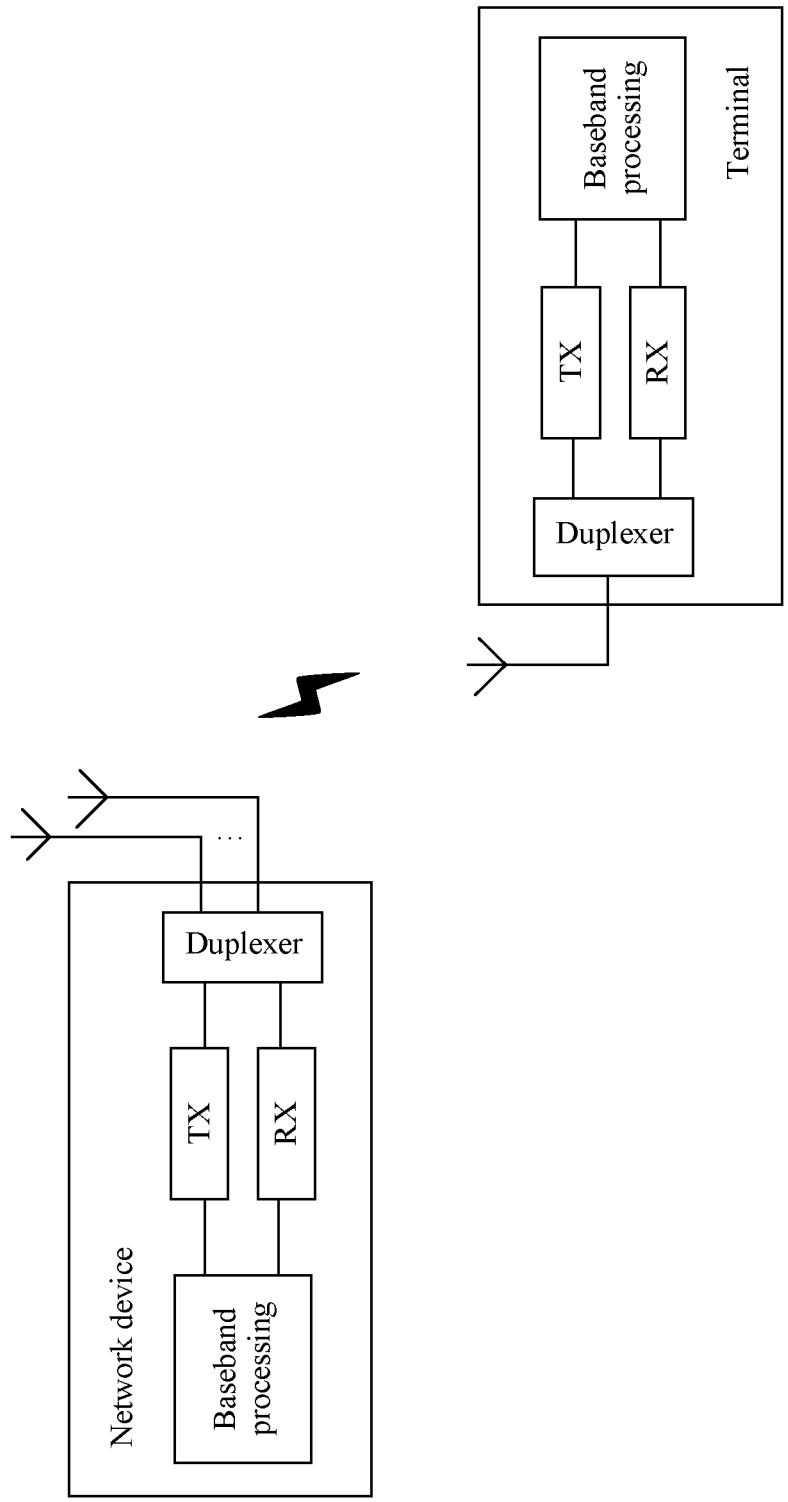
FIG. 3 is a simplified schematic diagram of internal structures of a network device and a terminal.

FIG. 3 is a simplified schematic diagram of internal structures of a network device and a terminal.

For example, the network device may include an antenna array, a duplexer, a transmitter (TX), a receiver (RX) (sometimes the TX and the RX are collectively referred to as a transceiver (TRX)), and a baseband processing part. The duplexer is configured to implement the antenna array and is configured to send and receive signals. The TX is configured to implement conversion between a radio frequency signal and a baseband signal. The TX may usually include a power amplifier (PA), a digital-to-analog converter (DAC), and a frequency converter. The RX may usually include a low noise amplifier (LNA), an analog-to-digital converter (ADC), and a frequency converter. The baseband processing part is configured to implement processing of a to-be-sent or received signal, such as layer mapping, precoding, modulation/demodulation, encoding/decoding, and perform separate processing on a physical control channel, a physical data channel, a physical broadcast channel, a reference signal, and the like.

In an optional way, the network device may further include a control part, configured to perform multi-user scheduling and resource allocation, pilot scheduling, user physical layer parameter configuration, and the like.

For example, the terminal may include an antenna, a duplexer, a transmitter (TX), a receiver (RX) (sometimes the TX and the RX are collectively referred to as a transceiver TRX), and a baseband processing part. In FIG. 2, the terminal has a single antenna. It may be understood that the terminal may also have a plurality of antennas (an antenna array).

The duplexer is configured to implement the antenna array and is configured to send and receive signals. The TX is configured to implement conversion between a radio frequency signal and a baseband signal. The TX may usually include a PA, a DAC, and a frequency converter. The RX may usually include an LNA, an ADC, and a frequency converter. The baseband processing part is configured to implement processing of a to-be-sent or received signal, such as layer mapping, precoding, modulation/demodulation, encoding/decoding, and perform separate processing on a physical control channel, a physical data channel, a physical broadcast channel, a reference signal, and the like.

In an optional way, the terminal may also include a control part, configured to: request an uplink physical resource, calculate channel state information (CSI) corresponding to a downlink channel, determine whether a downlink data packet is successfully received, and the like.

Figure 4:
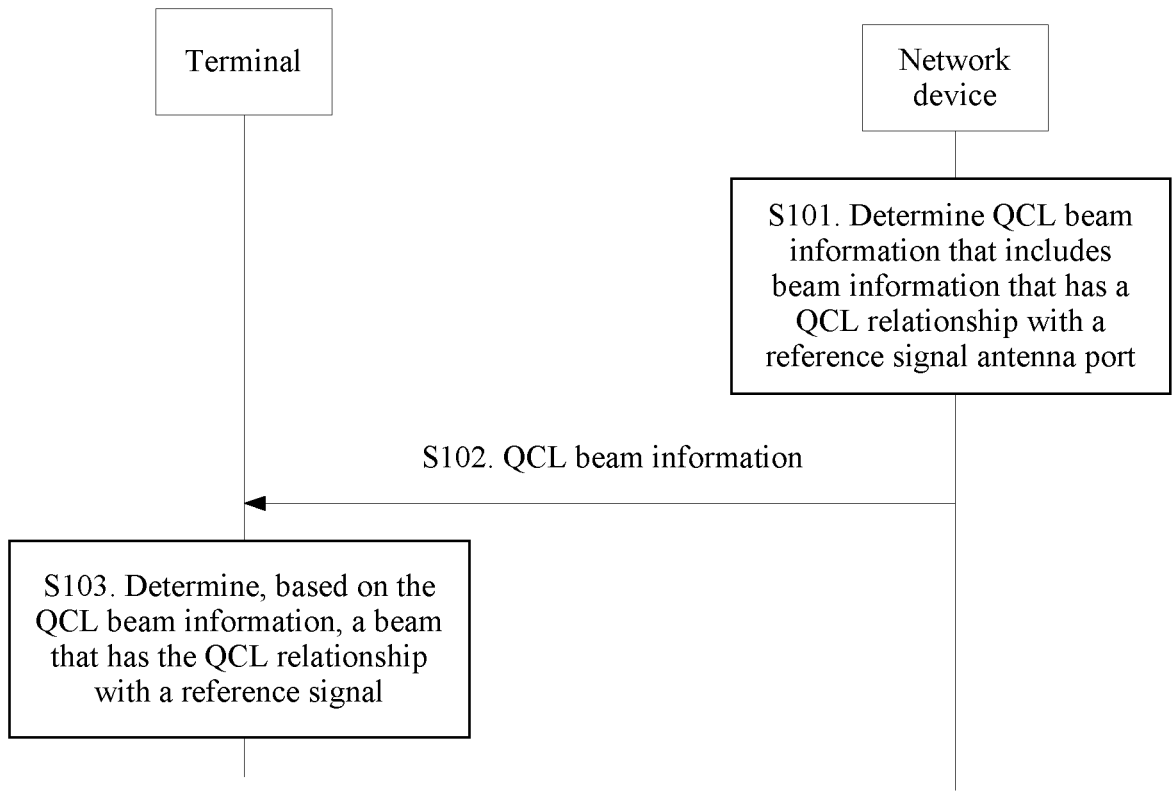
FIG. 4 is a flowchart of a QCL information configuration method according to an embodiment of this application.

FIG. 4 is a schematic flowchart of a quasi co-location information configuration method according to an embodiment of this application. As shown in FIG. 4, the method includes the following steps.

S101: A network device determines QCL beam information, where the QCL beam information includes beam information that has a quasi co-location QCL relationship with a reference signal antenna port.

In this embodiment of this application, the QCL beam information may be a beam identifier, beam antenna port information, or other beam-related information.

In this embodiment of this application, the QCL beam information is the beam information that has the QCL relationship with the reference signal antenna port. There may be one or more pieces of QCL beam information.

S102: The network device sends the QCL beam information, and a terminal receives the QCL beam information.

S103: The terminal may determine, based on the beam information that is included in the QCL beam information and that has the quasi co-location QCL relationship with the reference signal antenna port, a beam that has the QCL relationship with the reference signal antenna port.

Further, the terminal may determine a sent reference signal that is sent through the beam, and perform large-scale channel property estimation based on the determined sent reference signal.

It may be understood that this embodiment of this application is described by using the following optional way: The network device configures the beam information that has the quasi co-location QCL relationship with the reference signal antenna port, and sends the beam corresponding to the beam information and a reference signal corresponding to the reference signal antenna port, and the terminal receives the beam information, the beam, and the reference signal (the terminal determines a large-scale channel property of the received reference signal based on the beam).

In another possible design, the network device configures the beam information that has the quasi co-location QCL relationship with the reference signal antenna port, and the terminal receives the beam information, and sends the beam corresponding to the beam information and a reference signal corresponding to the reference signal antenna port. In this way, the network device may determine a large-scale channel property of the received reference signal based on the beam.

In another possible design, the network device configures the beam information that has the quasi co-location QCL relationship with the reference signal antenna port, and sends the beam corresponding to the beam information, and the terminal receives the beam information and the beam, and sends a reference signal corresponding to the reference signal antenna port. In this way, the terminal may determine a large-scale channel property of the sent reference signal based on the beam. This design may be applied to a scenario in which reciprocity exists between channels.

In another possible design, the network device configures the beam information that has the quasi co-location QCL relationship with the reference signal antenna port; the terminal receives the beam information, and sends the beam corresponding to the beam information; and the network device sends a reference signal corresponding to the reference signal antenna port. In this way, the network device may determine a large-scale channel property of the sent reference signal based on the beam. This design may be applied to a scenario in which reciprocity exists between channels.

In another possible design, the terminal sends, to the network device, the beam information that has the quasi co-location QCL relationship with the reference signal antenna port, and sends the beam corresponding to the beam information and a reference signal corresponding to the reference signal antenna port, and the network device receives the beam information, the beam corresponding to the beam information, and the reference signal corresponding to the reference signal antenna port. In this way, the network device may determine a large-scale channel property of the received reference signal based on the beam.

In another possible design, when reciprocity exists between channels, the terminal sends, to the network device, the beam information that has the quasi co-location QCL relationship with the reference signal antenna port, and sends the beam corresponding to the beam information, and the network device receives the beam information and the beam corresponding to the beam information, and sends a reference signal corresponding to the reference signal antenna port. In this way, the network device may determine a large-scale channel property of the sent reference signal based on the beam. This design may be applied to a scenario in which reciprocity exists between channels.

In another possible design, the beam information that has the quasi co-location QCL relationship with the reference signal antenna port is predefined in a protocol. In this case, the terminal and the network device have corresponding information (which does not need to be configured) indicating that the QCL relationship exists between the reference signal antenna port and the beam information. The beam corresponding to the beam information may be sent by the network device to the terminal, or may be sent by the terminal to the network device. The reference signal corresponding to the reference signal antenna port may be sent by the network device to the terminal, or may be sent by the terminal to the network device.

The solutions in the embodiments of this application may also be applied to the foregoing possible designs, and a corresponding apparatus (for example, a network device, a terminal, and a communications chip) provided in the embodiments of this application may change correspondingly. Details are not described herein.

A specific implementation process in which the network device configures the QCL beam information for the terminal is described below in this embodiment of this application.

In this embodiment of this application, the network device may configure the QCL beam information through RRC signaling sent to the terminal, for example, may configure, in the RRC signaling, QCL indication information that includes the QCL beam information. The terminal receives, through the RRC signaling, the QCL beam information from the network device. The terminal parses the RRC signaling to obtain the QCL beam information, and may determine, based on the beam information that is included in the QCL beam information and that has the QCL relationship with the reference signal antenna port, the beam that has the QCL relationship with the reference signal antenna port, and perform large-scale channel property estimation. In a possible design, a large-scale property of the reference signal antenna port may be determined based on the determined beam that has the QCL relationship with the reference signal antenna port.

Specifically, in this embodiment of this application, the QCL beam information may be added to original QCL indication information in the RRC signaling. The original QCL indication information is QCL indication information that does not include the QCL beam information and that is configured before application of the QCL information configuration method provided in this embodiment of this application. For example, signaling of the original QCL indication information in the RRC signaling may be configured in the following manner:

```
PDSCH-RE-MappingQCL-Config-r11 ::= SEQUENCE {
  pdsch-RE-MappingQCL-ConfigId-r11
  PDSCH-RE-MappingQCL-ConfigId-r11,
  optionalSetOfFields-r11      SEQUENCE {
  crs-PortsCount-r11   ENUMERATED {n1, n2, n4, spare1},
  crs-FreqShift-r11    INTEGER (0..5),
  mbsfn-SubframeConfigList-r11 CHOICE {
  release      NULL,
  setup    SEQUENCE {
  subframeConfigList      MBSFN-SubframeConfigList
  }
  }      OPTIONAL,-- Need ON
  pdsch-Start-r11   ENUMERATED {reserved, n1, n2, n3, n4,
                  assigned}
  }      OPTIONAL,-- Need OP
  csi-RS-ConfigZPId-r11 CSI-RS-ConfigZPId-r11,
  qcl-CSI-RS-ConfigNZPId-r11    CSI-RS-ConfigNZPId-r11
OPTIONAL,-- Need OR
  ...
}
```

In this embodiment of this application, in the foregoing signaling of the original QCL indication information, PDSCH-RE-MappingQCL-Config indicates a physical downlink shared channel resource element mapping and QCL configuration parameter. pdsch-RE-MappingQCL-ConfigId-r11 indicates a physical downlink shared channel resource element mapping and QCL configuration identifier included in the physical downlink shared channel resource element mapping and QCL configuration parameter. PDSCH-RE-MappingQCL-ConfigId-r11 indicates that a value of the physical downlink shared channel resource element mapping and QCL configuration identifier is PDSCH-RE-MappingQCL-ConfigId-r11.

qcl-CSI-RS-ConfigNZPId indicates a non-zero power (Non Zero Power, NZP) CSI-RS configuration identifier that has a QCL relationship with a data antenna port.

In this embodiment of this application, the QCL beam information added to the original QCL indication information may be beam identifier information, beam antenna port information, or other beam-related information. The beam identifier information may be beam synchronization signal identifier information. In this embodiment of this application, signaling obtained after the QCL beam information is added to the original QCL indication information in the RRC signaling may be configured in the following manner:

```
PDSCH-RE-MappingQCL-Config-r11 ::= SEQUENCE {
  pdsch-RE-MappingQCL-ConfigId-r11
  PDSCH-RE-MappingQCL-ConfigId-r11,
  optionalSetOfFields-r11      SEQUENCE {
  crs-PortsCount-r11   ENUMERATED {n1, n2, n4, spare1},
  crs-FreqShift-r11    INTEGER (0..5),
  mbsfn-SubframeConfigList-r11 CHOICE {
  release      NULL,
  setup    SEQUENCE {
  subframeConfigList      MBSFN-SubframeConfigList
  }
  }      OPTIONAL,-- Need ON
  pdsch-Start-r11   ENUMERATED {reserved, n1, n2, n3, n4,
                  assigned}
  }      OPTIONAL,-- Need OP
  csi-RS-ConfigZPId-r11 CSI-RS-ConfigZPId-r11,
  qcl-CSI-RS-ConfigNZPId-r11    CSI-RS-ConfigNZPId-r11
OPTIONAL,-- Need OR
  qcl-beam-ConfigIdbeam-ConfigId      OPTIONAL,--
                           Need OR
  (qcl-beam-RS ports      beam-RS ports
OPTIONAL, -- Need OR)
  ...
}
```

The QCL beam information is added when the foregoing signaling of the QCL indication information in the RRC signaling is compared with the signaling of the original QCL indication information. The added QCL beam information is Qcl-beam-ConfigId or qcl-beam-RS ports, where Qcl-beam-ConfigId indicates beam identifier information that has a QCL relationship, and qcl-beam-RS ports indicates beam antenna port information that has a QCL relationship.

Optionally, in this embodiment of this application, a plurality of groups (at least one group) of QCL beam information may be added to the original QCL indication information, so that the plurality of groups of QCL beam information that has a QCL relationship with the reference signal is configured for the reference signal in a same TRP.

In this embodiment of this application, if the network device configures and sends at least one group of QCL beam information to the terminal through RRC signaling, the network device may indicate, through downlink control information (DCI), a QCL beam applicable to a reference signal currently used by the terminal. The QCL beam applicable to the currently used reference signal is the beam information that has the QCL relationship with the reference signal antenna port. The terminal receives, through the RRC signaling, the at least one group of QCL beam information from the network device, and determines, according to the DCI indication, the QCL beam applicable to the currently used reference signal.

For ease of description, the DCI that is used to indicate the QCL beam information of the terminal may be referred to as first DCI in this embodiment of this application.

It may be understood that in this embodiment of this application, adding the QCL beam information to the original QCL indication information in the RRC signaling may be implemented in the following two manners:

In a first implementation, the QCL beam information is added to data resource mapping (PDSCH RE Mapping) and QCL configuration information, so that parameter information used to indicate that the QCL beam information is added to the RRC signaling is added to a physical layer protocol.

In another implementation, the QCL beam information is added to a non-zero power (NZP) CSI-RS configuration parameter, to indicate QCL beam information of a CSI-RS.

The two specific implementation processes of sending the QCL beam information through RRC signaling are described below with reference to an actual application as an optional way in this embodiment of this application.

In this embodiment of this application, an optional way in which the reference signal is a DMRS is first used to describe an implementation process of adding the QCL beam information to the data resource mapping and QCL configuration parameter.

In this embodiment of this application, the network device may use a PDSCH RE Mapping and PDSCH antenna port QCL configuration parameter to configure QCL beam information that has a QCL relationship with a DMRS antenna port at which the terminal sends data. The QCL beam information includes a QCL beam identifier, QCL beam antenna port information, or other beam-related information. The network device sends, to the terminal, the QCL beam information that has the QCL relationship with the DMRS antenna port at which the terminal sends data, so that the terminal obtains a beam that has the QCL relationship with the DMRS antenna port at which the data is sent, further determines a sent reference signal that is sent through the beam, and performs large-scale channel property estimation based on the determined sent reference signal.

In this embodiment of this application, an optional way of the PDSCH RE Mapping and PDSCH antenna port QCL configuration parameter obtained after the QCL beam information is added is as follows. The added QCL beam information is Qcl-beam-ConfigId or qcl-beam-RS ports, where Qcl-beam-ConfigId indicates beam identifier information that has a QCL relationship, and qcl-beam-RS ports indicates beam antenna port information that has a QCL relationship.

Quantity of CRS antenna ports: crs-PortsCount-r11
CRS frequency offset: crs-FreqShift-r11
Multicast/single frequency network subframe configuration: mbsfn-SubframeConfigList-r11
Zero power (Zero Power, ZP) CSI-RS configuration identifier: csi-RS-ConfigPId-r11
pdsch start point: pdsch-Start-r11
NZPCSI-RS configuration identifier that has a QCL relationship with a data antenna port: qcl-CSI-RS-ConfigNZPId-r11
QCL beam information: Qcl-beam-ConfigId (qcl-beam-RS ports)

TABLE 1

Further, a quantity of original PDSCH RE Mapping and PDSCH antenna port QCL configuration parameters is limited, and may be insufficient to meet a requirement for adding the QCL beam information to the PDSCH RE Mapping and PDSCH antenna port QCL configuration parameter. Therefore, bits in DCI for indicating the PDSCH RE Mapping and PDSCH antenna port QCL configuration parameter need to be extended, to ensure that sufficient bits indicate the added QCL beam information. For example, it is assumed that the network device can currently configure four different PDSCH RE Mapping and PDSCH antenna port QCL configuration parameter sets for the terminal. If the network device can form four beams at present, each beam may have four parameter sets, to be specific, 16 PDSCH RE Mapping and PDSCH antenna port QCL configuration parameters are required in total. Therefore, the bits in an indication field in the DCI for indicating the PDSCH RE Mapping and PDSCH antenna port QCL configuration parameter need to be extended to at least four bits, to indicate the 16 PDSCH RE Mapping and PDSCH antenna port QCL configuration parameters. For example, the PDSCH RE Mapping and PDSCH antenna port QCL configuration parameter may be indicated in an indication manner in which bits in the indication field in the DCI are four bits shown in Table 1: Value of a PDSCH RE Mapping and PDSCH antenna port QCL configuration TABLE 1-continued

| parameter in an indication field | Description |
| --- | --- |
| '0000' | Parameter set 1 configured by a higher layer |
| '0001' | Parameter set 2 configured by a higher layer |
| '0010' | Parameter set 3 configured by a higher layer |
| '0011' | Parameter set 4 configured by a higher layer |
| ... | ... |
| '1111' | Parameter set 6 configured by a higher layer |

In this embodiment of this application, an optional way in which the reference signal is a CSI-RS is used below to describe a process of adding QCL beam identifier information or QCL beam antenna port information to the NZP CSI-RS configuration parameter.

In this embodiment of this application, the QCL beam information may be added to the NZP CSI-RS resource configuration information (CSI-RS-ConfigNZP) in the QCL indication information of the RRC signaling. The QCL beam information is used to indicate the QCL beam identifier information, the QCL beam antenna port information, or other beam-related information that has a QCL relationship with a CSI-RS antenna port, to indicate the QCL beam information of the reference signal (for example, a CSI-RS) used by the terminal. In this embodiment of this application, the QCL beam information may be added to the NZP CSI-RS resource configuration information, and specific signaling may be configured as follows:

```
-- ASN1START
    CSI-RS-ConfigNZP-r11 ::=      SEQUENCE {
    csi-RS-ConfigNZPId-r11            CSI-RS-ConfigNZPId-r11,
    antennaPortsCount-r11             ENUMERATED {an1, an2, an4, an8},
    resourceConfig-r11                INTEGER (0..31),
    qcl_beam_ConfigId                                beam-ConfigId
    OPTIONAL,-- Need
    (qcl-beam-RS ports        beam-RS ports            OPTIONAL,--
Need OR)
    subframeConfig-r11                 INTEGER (0..154),
    scramblingIdentity-r11             INTEGER (0..503),
qcl-CRS-Info-r11                    SEQUENCE {
    qcl-ScramblingIdentity-r11      INTEGER (0..503),
    crs-PortsCount-r11              ENUMERATED {n1, n2, n4, spare1},
    mbsfn-SubframeConfigList-r11    CHOICE {
    release                         NULL,
    setup                           SEQUENCE {
    subframeConfigList                 MBSFN-SubframeConfigList
    }
    }                                  OPTIONAL -- Need ON
    }                                  OPTIONAL,-- Need OR
    ...,
    [[   eMIMO-Info-r13                   CHOICE {
    release                         NULL,
    setup                           SEQUENCE {
    nzp-resourceConfigList-r13 SEQUENCE     (SIZE    (2..8))     OF
ResourceConfig-r13,
    cdmType                       ENUMERATED     {cdm2,     cdm4}
    OPTIONAL -- Need OR
    }
    }                                  OPTIONAL -- Need ON
    ]]
    }
    ResourceConfig-r13 ::=       INTEGER (0..31)
-- ASN1STOP
```

The QCL beam information is added to an NZP CSI-RS configuration identifier (csi-RS-ConfigNZPId) in the NZP CSI-RS resource configuration information (CSI-RS-ConfigNZP), and signaling of the added QCL beam information is Qcl-beam-ConfigId or qcl-beam-RS ports, where Qcl-beam-ConfigId indicates the beam identifier information that has a QCL relationship, and qcl-beam-RS ports indicates the beam antenna port information that has a QCL relationship.

Further, the network device currently configures a plurality of pieces of CSI-RS resource configuration information for the terminal in one TRP through RRC signaling. Each piece of CSI-RS resource configuration information corresponds to one piece of CSI-RS-ConfigNZPId, and may indicate a quantity of antenna ports of the CSI-RS resource, resource configuration, subframe configuration, a scrambling identifier, a QCL relationship between the CSI-RS and a CRS, and the like. The terminal may obtain, based on the QCL correspondence between a CSI-RS antenna port and a CRS antenna port, a CRS antenna port corresponding to a DMRS, to determine the CRS and perform large-scale channel property estimation. Therefore, in this embodiment of this application, if the reference signal is a DMRS, QCL beam information of the DMRS may be indicated by CSI-RS resource configuration information corresponding to the CSI-RS-ConfigNZPId to which the QCL beam information is added, and QCL beam information that has a QCL relationship with a DMRS antenna port is the QCL beam information included in the CSI-RS resource configuration information corresponding to CSI-RS-ConfigNZPId. After receiving CSI-RS-ConfigNZPId to which the QCL beam information is added, the terminal may determine, based on the QCL beam information in the CSI-RS resource configuration information corresponding to CSI-RS-ConfigNZPId, the beam information that has the QCL relationship with the DMRS, to determine a beam signal and perform large-scale channel property estimation. It can be learned from the specific example that the CSI-RS resource configuration information corresponding to CSI-RS-ConfigNZPId to which the QCL beam information is added may be sent through RRC signaling, and the QCL beam information that has the QCL relationship with the DMRS antenna port may be determined by using CSI-RS-ConfigNZPId in a PDSCH RE Mapping and PDSCH antenna port QCL configuration parameter indicated in an indication field for indicating the PDSCH RE Mapping and PDSCH antenna port QCL configuration parameter in DCI.

Optionally, in this embodiment of this application, the network device may determine, based on a time domain resource and/or a frequency domain resource used for sending a reference signal through the reference signal antenna port, the QCL beam information that has the QCL relationship with the reference signal antenna port on the time domain resource and/or the frequency domain resource; and send, to the terminal, the QCL beam information that has the QCL relationship with the reference signal antenna port on the time domain resource and/or the frequency domain resource. The terminal receives the QCL beam information that is from the network device and that has the QCL relationship with the reference signal antenna port on the time domain resource and/or the frequency domain resource.

Specifically, the network device may add QCL beam information for a frequency domain resource in a frequency domain list used by the reference signal, to form a frequency domain QCL beam information list of the reference signal. The frequency domain QCL beam information list includes at least one piece of QCL beam information that has a QCL relationship with the reference signal antenna port on at least one frequency domain resource. The network device may add QCL beam information for a time domain resource in a time domain list used by the reference signal, to form a time domain QCL beam information list of the reference signal. The time domain QCL beam information list includes at least one piece of QCL beam information that has a QCL relationship with the reference signal antenna port on at least one time domain resource. The network device may add QCL beam information for a time-frequency domain resource in a time-frequency domain resource list used by the reference signal, to form a time-frequency domain QCL beam information list of the reference signal. The time-frequency domain QCL beam information list includes at least one piece of QCL beam information that has a QCL relationship with the reference signal antenna port on at least one time-frequency domain resource. The time-frequency domain resource is a time domain resource and a frequency domain resource that have a one-to-one correspondence with each other.

An optional way of configuring CSI-RS signaling is used. In this embodiment of this application, a specific configuration manner of configuring signaling that has a time domain list, a time domain QCL beam information list, a frequency domain QCL beam information list, and a time-frequency domain QCL beam information list may be as follows:

subframeConfigList is used to indicate time domain location information, and time-frequencyConfigList is used to indicate time-frequency domain location information. QCL beam information is added to an NZP CSI-RS configuration identifier (csi-RS-ConfigNZPId) of NZP CSI-RS resource configuration information (CSI-RS-ConfigNZP), and the added QCL beam information is Qcl-beam-ConfigId-List or qcl-beam-RS ports-List.

When Qcl-beam-ConfigId-List or qcl-beam-RS ports-List is corresponding to frequencyConfigList, Qcl-beam-ConfigId-List or qcl-beam-RS ports-List represents the frequency domain QCL beam information list.

When Qcl-beam-ConfigId-List or qcl-beam-RS ports-List is corresponding to subframeConfigList, Qcl-beam-ConfigId-List or qcl-beam-RS ports-List represents the time domain QCL beam information list.

When Qcl-beam-ConfigId-List or qcl-beam-RS ports-List is corresponding to time-frequencyConfigList, Qcl-beam-ConfigId-List or qcl-beam-RS ports-List represents the time-frequency domain QCL beam information list.

In this embodiment of this application, the network device sends at least one of the time domain QCL beam information list, the frequency domain QCL beam information list, and the time-frequency domain QCL beam information list to the

```
-- ASN1START
CSI-RS-ConfigNZP-r11 ::=      SEQUENCE {
    csi-RS-ConfigNZPId-r11        CSI-RS-ConfigNZPId-r11,
    antennaPortsCount-r11         ENUMERATED  {an1,  an2,  an4, an8},
    resourceConfig-r11            INTEGER (0..31),
    qcl_beam__ConfigId-List                   sequence(size(2..N))of beam-ConfigId
        OPTIONAL,-- Need OR
    (qcl-beam-RS ports-List       beam-RS ports
        OPTIONAL,-- Need OR)
    frequencyConfigList           sequence (size(2..N))of BIT STRING
        OPTIONAL,-- Need OR
    subframeConfigList            sequence(size(2..N))of INTEGER (0..154)
        OPTIONAL,-- Need OR
    time-frequencyConfigList    sequence(size(2..N))of INTEGER (0..154) OPTIONAL,--
        Need OR
    subframeConfig-r11            INTEGER (0..154),
    scramblingIdentity-r11        INTEGER (0..503),
    qcl-CRS-Info-r11      SEQUENCE {
        qcl-ScramblingIdentity-r11    INTEGER (0..503),
        crs-PortsCount-r11            ENUMERATED {n1, n2, n4, spare1},
        mbsfn-SubframeConfigList-r11  CHOICE {
            release                       NULL,
            setup                         SEQUENCE {
            subframeConfigList       MBSFN-SubframeConfigList
        }
        }                             OPTIONAL -- Need ON
    }                             OPTIONAL,-- Need OR
    ...,
    [[  eMIMO-Info-r13           CHOICE {
        release                   NULL,
        setup                     SEQUENCE {
        nzp-resourceConfigList-r13  SEQUENCE  (SIZE   (2..8))  OF ResourceConfig-r13,
            cdmType                 ENUMERATED   {cdm2,    cdm4} OPTIONAL -- Need OR
        }
        }       OPTIONAL -- Need ON
    ]]
}
ResourceConfig-r13 ::=    INTEGER (0..31)
-- ASN1STOP
```

In the foregoing CSI-RS signaling, frequencyConfigList is used to indicate frequency domain location information, terminal. The terminal receives at least one of the time domain QCL beam information list, the frequency domain QCL beam information list, and the time-frequency domain QCL beam information list that are from the network device. After the network device sends the frequency domain QCL beam information list to the terminal, the terminal may determine QCL beams of the reference signal on different frequency bands, and then perform large-scale channel property estimation on the different frequency bands. After the network device sends, to the terminal, QCL indication information that includes the time domain QCL beam information list, the terminal may determine QCL beams of the reference signal in different subframes, timeslots, or other time units, and then perform large-scale channel property estimation in the different subframes, timeslots, or other time units. After the network device sends the time-frequency domain QCL beam information list to the terminal, the terminal may determine QCL beams of the reference signal on different time-frequency domain resources, and then perform large-scale channel property estimation in different time-frequency domains.

In this embodiment of this application, after configuring, in the foregoing manner, the RRC signaling that includes the QCL beam information, the network device may send the configured RRC signaling to the terminal. After receiving the RRC signaling, the terminal may determine, by using the QCL beam information in the RRC signaling, the beam that has the QCL relationship with the reference signal antenna port, further determine the sent reference signal that is sent through the beam, and perform large-scale channel property estimation based on the determined sent reference signal.

In this embodiment of this application, the network device may configure the QCL beam information for the terminal in the following manner:

The network device may send the QCL beam information through DCI in this embodiment of this application.

Specifically, in this embodiment of this application, the QCL beam information may be added to the DCI sent by the network device to the terminal, and the DCI to which the QCL beam information is added is sent to the terminal. The terminal receives, through the DCI, the QCL beam information that has the QCL relationship with the reference signal antenna port. In this embodiment of this application, a signaling configuration manner of adding the QCL beam information to the DCI may be as follows:

The following information is transmitted by means of the DCI format 2D: PDSCH RE Mapping and Quasi-Co-Location Indicator—2 bits qcl_beam_ConfigId-2 bits (beam ID or beam RS ports)

In the foregoing DCI signaling, the QCL beam information is added, and the added QCL beam information is qcl_beam_ConfigId, where qcl_beam_ConfigId may be the beam identifier (beam ID) or the beam antenna port information (beam RS ports).

For ease of description, the DCI that includes QCL indication information and that is sent by the network device to the terminal may be referred to as second DCI in this embodiment of this application.

In this embodiment of this application, the QCL beam information added to the second DCI is beam information that has a QCL relationship with a reference signal antenna port currently used by the terminal for transmitting data. After the network device sends the second DCI to the terminal, the terminal may accurately determine, based on the received second DCI, a beam that has the QCL relationship with the reference signal antenna port currently used for transmitting data and a sent reference signal sent by the determined beam, to perform large-scale channel property estimation based on the determined sent reference signal.

It should be noted that the terms "first", "second", and the like in the specification, claims, and accompanying drawings in the embodiments of this application are used to distinguish between similar objects but do not necessarily indicate a specific order or sequence. For example, the first DCI and the second DCI in the embodiments of this application are merely used to conveniently describe and distinguish between different thresholds, and does not constitute a limitation on DCI. It should be understood that the terms in such a way can be interchanged in proper circumstances, so that the embodiments of this application described herein can be implemented in orders other than the order illustrated or described herein.

The foregoing mainly describes the solutions provided in the embodiments of this application from a perspective of interaction between a terminal and a network device. It may be understood that to implement the foregoing functions, the terminal and the network device include corresponding hardware structures and/or software modules for performing the functions. With reference to units and algorithm steps of each example described in the embodiments disclosed in this application, the embodiments of this application may be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the technical solutions of the embodiments of this application.

In an embodiment of this application, function unit division may be performed on the terminal and the network device based on the foregoing method example. For example, each function unit may be obtained through division based on a corresponding function, or two or more functions may be integrated into one processing unit. The integrated unit may be implemented in a form of hardware, or may be implemented in a form of a software functional unit. It should be noted that the unit division in the embodiments of this application is an optional way, and is merely logical function division and may be another division manner in actual implementation.

Figure 5:
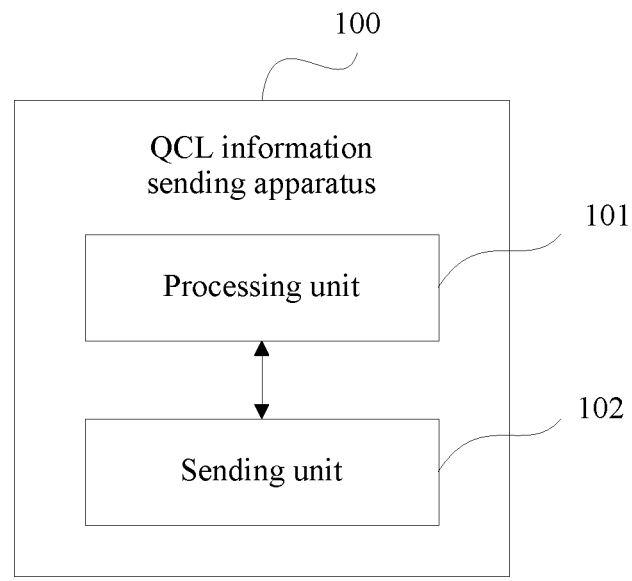
FIG. 5 is a schematic structural diagram of a QCL information sending device according to an embodiment of this application.

When an integrated unit is used, FIG. 5 is a schematic structural diagram of a QCL information sending apparatus 100 according to an embodiment of this application. The QCL information sending apparatus 100 includes a processing unit 101 and a sending unit 102. The processing unit 101 is configured to determine QCL beam information. The QCL beam information includes beam information that has a quasi co-location QCL relationship with a reference signal antenna port. The sending unit 102 is configured to send the QCL beam information determined by the processing unit 101.

The QCL beam information may include at least one of beam identifier information and beam antenna port information.

Optionally, the sending unit 102 may send the QCL beam information in the following manner:

if the QCL beam information includes at least one group of QCL beam information, sending the at least one group of QCL beam information through radio resource control RRC signaling.

Optionally, the QCL beam information may be configured in data resource mapping and QCL configuration information and/or non-zero power channel state information reference signal configuration information.

Optionally, the processing unit 101 may determine, based on a time domain resource and/or a frequency domain resource used for sending a reference signal through the reference signal antenna port, the QCL beam information that has the QCL relationship with the reference signal antenna port on the time domain resource and/or the frequency domain resource. The sending unit 102 sends the QCL beam information that has the QCL relationship with the reference signal antenna port on the time domain resource and/or the frequency domain resource.

The sending unit 102 may send at least one of a time domain QCL beam information list, a frequency domain QCL beam information list, and a time-frequency domain QCL beam information list. The time domain QCL beam information list includes at least one piece of QCL beam information that has a QCL relationship with the reference signal antenna port on at least one time domain resource. The frequency domain QCL beam information list includes at least one piece of QCL beam information that has a QCL relationship with the reference signal antenna port on at least one frequency domain resource. The time-frequency domain QCL beam information list includes at least one piece of QCL beam information that has a QCL relationship with the reference signal antenna port on at least one time-frequency domain resource.

The sending unit 102 may send, through downlink control information DCI, the QCL beam information that has the QCL relationship with the reference signal antenna port.

Optionally, the beam identifier information is beam synchronization signal identifier information.

Optionally, the beam is a reference signal for beam scanning, a beam reference signal, a reference signal for beam scanning, or a beam synchronization signal.

When a form of hardware is used for implementation, in this embodiment of this application, the processing unit 101 may be a processor or a controller. The sending unit 102 may be a communications interface, a transceiver, a transceiver circuit, or the like. The communications interface is a generic term, and may include one or more interfaces.

Figure 6:
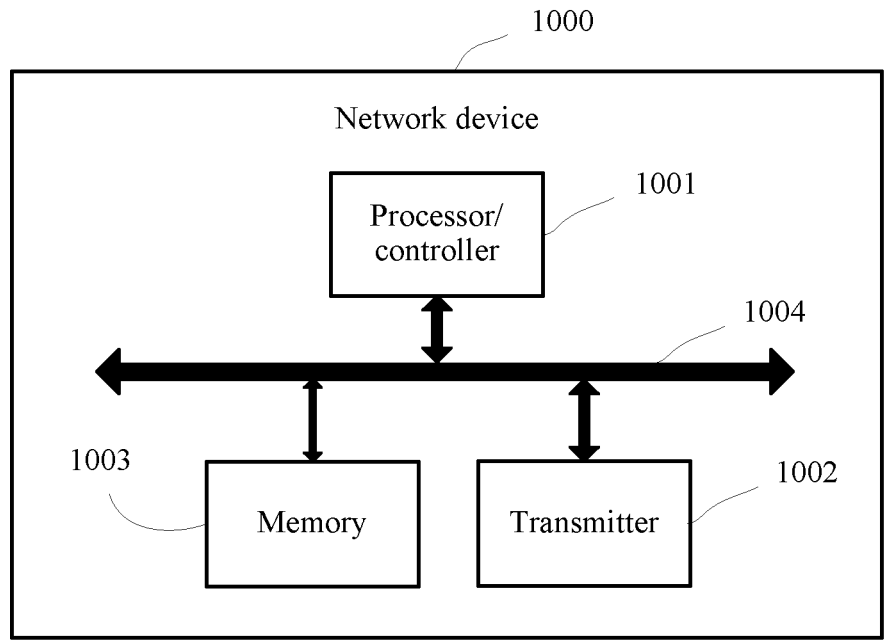
FIG. 6 is a schematic structural diagram of a network device according to an embodiment of this application.

When the processing unit 101 is a processor, and the sending unit 102 is a transmitter, the QCL information sending apparatus 100 in this embodiment of this application may be a network device shown in FIG. 6. The network device shown in FIG. 6 may be a base station.

FIG. 6 is a schematic structural diagram of a network device 1000 according to an embodiment of this application. As shown in FIG. 6, the network device 1000 includes a processor 1001 and a transmitter 1002. The processor 1001 may be a controller, and is indicated as a "controller/processor 1001" in FIG. 6. The processor 1001 is configured with a function of the network device to support the network device performing the QCL beam information sending and receiving method. The transmitter 1002 is configured with a function to support the network device sending QCL beam information. The network device may further include a memory 1003 and a bus 1004. The memory 1003 is configured to couple with the processor 1001, and store a program instruction and data necessary for the network device. The processor 1001, the memory 1003, and the transmitter 1002 are connected through the bus system 1004. The memory 1003 is configured to store instructions. The processor 1001 is configured to execute the instructions stored in the memory 1003, to control the transmitter 1002 to send a signal and perform steps of corresponding functions performed by the network device in the foregoing method.

In this embodiment of this application, for concepts, explanation, detailed description, and other steps that are related to the technical solutions provided in this embodiment of this application and that are used in the QCL information sending apparatus 100 and the network device 1000, refer to description about the content in the foregoing method or other embodiments. Details are not described herein again.

Figure 7:
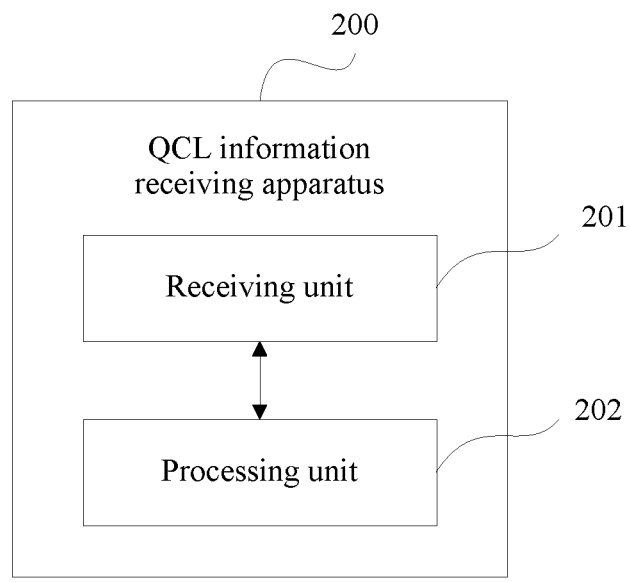
FIG. 7 is a schematic structural diagram of a QCL information receiving device according to an embodiment of this application.

When an integrated unit is used, FIG. 7 is a schematic structural diagram of a QCL information receiving apparatus 200 according to an embodiment of this application. The QCL information receiving apparatus 200 includes a receiving unit 201 and a processing unit 202. The receiving unit 201 is configured to receive QCL beam information from a network device. The QCL beam information includes beam information that has a QCL relationship with a reference signal antenna port. The processing unit 202 is configured to: determine, based on the beam information that is received by the receiving unit 201, that is included in the QCL beam information, and that has the QCL relationship with the reference signal antenna port, a beam that has the QCL relationship with the reference signal antenna port, determine a sent reference signal that is sent through the beam, and perform large-scale channel property estimation based on the determined sent reference signal. Alternatively, the processing unit 202 is configured to determine, based on the beam information that is received by the receiving unit 201, that is included in the QCL beam information, and that has the QCL relationship with the reference signal antenna port, a beam that has the QCL relationship with the reference signal antenna port. Optionally, the processing unit 202 is further configured to:

determine a large-scale property of the reference signal antenna port based on the determined beam that has the QCL relationship with the reference signal antenna port.

Optionally, if the QCL beam information includes at least one group of QCL beam information, the receiving unit 201 receives, through RRC signaling, the at least one group of QCL beam information from the network device.

The QCL beam information may be configured in data resource mapping and QCL configuration information and/or non-zero power channel state information reference signal configuration information.

Optionally, the QCL beam information that has the QCL relationship with the reference signal antenna port is determined by the network device based on a time domain resource and/or a frequency domain resource used for sending a reference signal through the reference signal antenna port. The receiving unit 201 receives the QCL beam information that is from the network device and that has the QCL relationship with the reference signal antenna port on the time domain resource and/or the frequency domain resource.

The receiving unit 201 may receive at least one of a time domain QCL beam information list, a frequency domain QCL beam information list, and a time-frequency domain QCL beam information list that are from the network device.

Optionally, the receiving unit 201 may receive, through DCI, the QCL beam information that has the QCL relationship with the reference signal antenna port.

Optionally, the beam identifier information is beam synchronization signal identifier information.

Optionally, the beam is a reference signal for beam scanning, a beam reference signal, a reference signal for beam scanning, or a beam synchronization signal.

When a form of hardware is used for implementation, in this embodiment of this application, the processing unit 202 may be a processor or a controller. The receiving unit 201 may be a communications interface, a transceiver, a transceiver circuit, or the like. The communications interface is a generic term, and may include one or more interfaces.

Figure 8:
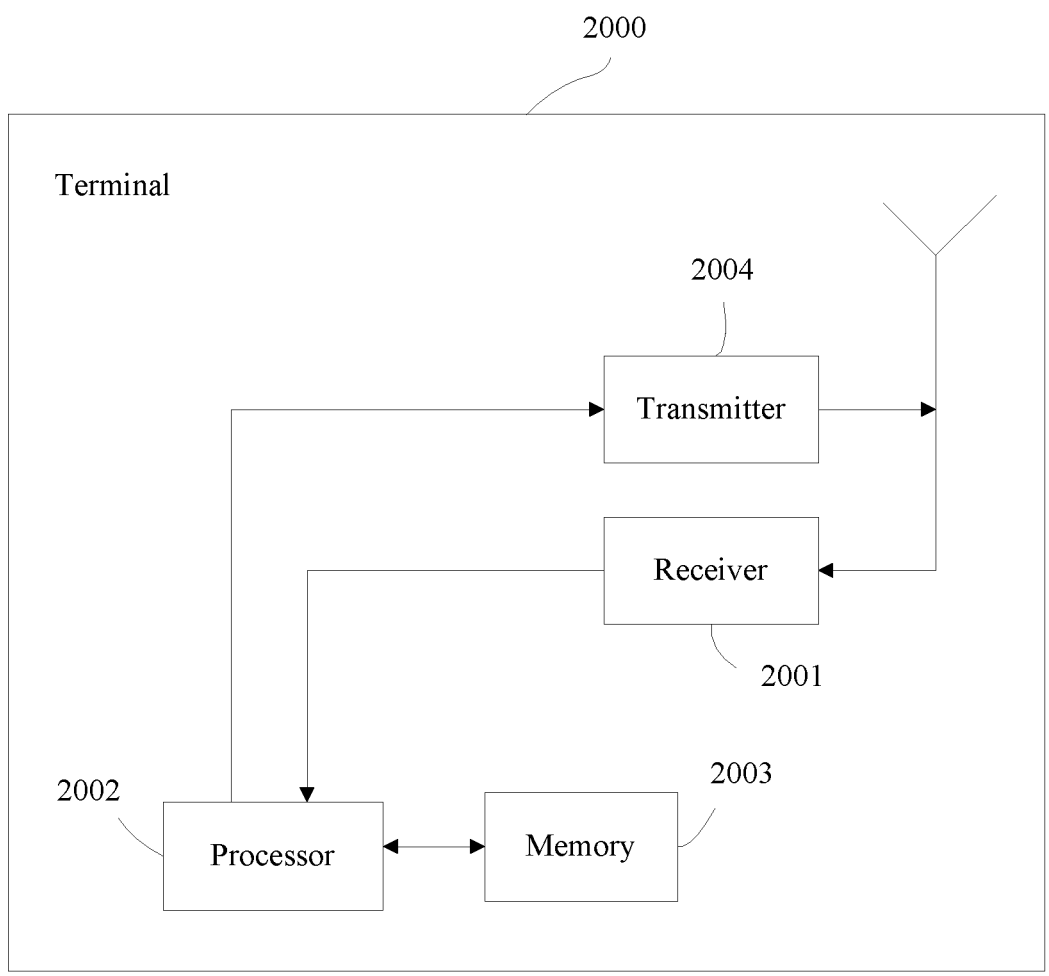
FIG. 8 is a schematic structural diagram of a terminal according to an embodiment of this application.

When the processing unit 202 is a processor, and the receiving unit 201 is a receiver, the QCL information receiving apparatus 200 in this embodiment of this application may be a terminal shown in FIG. 8.

FIG. 8 is a schematic structural diagram of a terminal 2000 according to an embodiment of this application. Referring to FIG. 8, the terminal 2000 includes a receiver 2001 and a processor 2002. The receiver 2001 is configured to support the terminal receiving QCL beam information transmitted by a network device. The processor 2002 is configured with a function of the terminal for supporting the terminal performing the QCL information sending and receiving method. The terminal may further include a memory 2003 and a transmitter 2004. The memory 2003 is configured to couple with the processor 2002, and store a program instruction and data that are necessary for the terminal. The transmitter 2004 is configured to send a signal.

In this embodiment of this application, for concepts, explanation, detailed description, and other steps that are related to the technical solutions provided in this embodiment of this application and that are used in the QCL information receiving apparatus 200 and the terminal 2000, refer to description about the content in the foregoing method or other embodiments. Details are not described herein again.

It may be understood that, in the accompanying drawings of the embodiments of this application, only simplified designs of the network device and the terminal are shown. In actual application, the network device and the terminal are not limited to the foregoing structure. For example, the terminal may further include a display device, an input/output interface, and the like, and all terminals that can implement the embodiments of this application are within the protection scope of the embodiments of this application. The network device may further include any quantity of transmitters, receivers, processors, controllers, memories, communications units, or the like, and all network devices that can implement the embodiments of this application are within the protection scope of the embodiments of this application.

It should be noted that the processor in the embodiments of this application may be a central processing unit (CPU), a general purpose processor, a digital signal processor (DSP), an application-specific integrated circuit (ASIC), a field programmable gate array (FPGA) or another programmable logical device, a transistor logic device, a hardware component, or a combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

The memory may be integrated in the processor, or may be separated from the processor.

In an implementation, functions of the receiver and the transmitter may be considered to be implemented by a transceiver circuit or a dedicated transceiver chip. The processor may be considered to be implemented by a dedicated processing chip, processing circuit, or processor or universal chip.

In another implementation, program code that is used to implement functions of the processor, the receiver, and the transmitter is stored in the memory. A general purpose processor implements the functions of the processor, the receiver, and the transmitter by executing the code in the memory.

According to the method provided in the embodiments of this application, an embodiment of this application further provides a communications system, which includes the foregoing network device and one or more terminals.

An embodiment of this application further provides a computer storage medium, configured to store some instructions. When the instructions are executed, any method related to the foregoing terminal or network device may be performed.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An apparatus, comprising:
a receiver, configured to receive a beam synchronization signal from a network device and receiving signaling from the network device, the signaling indicating a quasi co-location (QCL) relationship between a reference signal antenna port of a first reference signal and first QCL beam information, the first reference signal received on a first frequency domain location of a plurality of frequency domain locations, the first QCL beam information being one of a plurality of pieces of QCL beam information, the first reference signal on the first frequency domain location corresponding to the first QCL beam information and a second reference signal on a second frequency domain location of the plurality of frequency domain locations corresponding to a second QCL beam information of the plurality of pieces of QCL beam information, and the first QCL beam information comprising beam identifier information associated with the beam synchronization signal received from the network device; and
a processor, configured to determine, based on the received signaling, the first QCL beam information and determine a large-scale property of the reference signal antenna port of the first reference signal on the first frequency domain location based on the first QCL beam information corresponding to the first frequency domain location and the beam synchronization signal, wherein the receiver is further configured to receive the first reference signal on the first frequency domain location and on the reference signal antenna port based on the determined large-scale property of the reference signal antenna port of the first reference signal.

2. The apparatus according to claim 1, wherein the signaling is radio resource control (RRC) signaling.

3. The apparatus according to claim 1, wherein the reference signal antenna port is a demodulation reference signal (DMRS) antenna port and the reference signal is a DMRS.

4. The apparatus according to claim 3, wherein the first QCL beam information comprises at least one group of first QCL beam information; and the signaling comprises radio resource control (RRC) signaling.

5. The apparatus according to claim 4, wherein the processor is further configured to:
receive, from the network device, an indication indicating one group of the at least one group of first QCL beam information; and
determine the group of first QCL beam information based on the received indication.

6. The apparatus according to claim 5, wherein the indication is received through downlink control information (DCI).

7. The apparatus according to claim 5, wherein the processor is further configured to:
determine the large-scale property of the reference signal antenna port based on the determined group of first QCL beam information, wherein the large-scale property comprises one or more of: a delay spread, a Doppler spread, a Doppler frequency shift (Doppler shift), an average channel gain (average gain), an average delay, an angle of arrival (AOA), an angle of arrival spread (AAS), an angle of departure (AOD), an angle of departure spread (ADS), a spatial reception parameter (spatial RX parameters), or a spatial correlation.

8. The apparatus according to claim 1, wherein the reference signal antenna port comprises a channel state information-reference signal (CSI-RS) antenna port and the reference signal is a CSI-RS.

9. The apparatus according to claim 8, wherein the signaling is radio resource control (RRC) signaling.

10. The apparatus according to claim 8, wherein the first QCL beam information is indicated by information included in non-zero power (NZP) CSI-RS configuration information.

11. The apparatus according claim 10, wherein the NZP CSI-RS further comprises information associated with the CSI-RS antenna port.

12. The apparatus according to claim 10, wherein the processor is further configured to determine the large-scale property of the CSI-RS antenna port based on the first QCL beam information indicated by information included in the NZP CSI-RS configuration information, the large-scale property comprising one or more of: a delay spread, a Doppler spread, a Doppler frequency shift (Doppler shift), an average channel gain (average gain), an average delay, an angle of arrival (AOA), an angle of arrival spread (AAS), an angle of departure (AOD), an angle of departure spread (ADS), a spatial reception parameter (spatial RX parameters), or a spatial correlation.

13. The apparatus according to claim 1, wherein the beam identifier information is beam synchronization signal identifier information, or, beam reference signal identifier information.

14. The apparatus according to claim 2, wherein the first QCL beam information is indicated by information included in non-zero power channel state information reference signal (NZP CSI-RS) configuration information when the reference signal antenna port comprises a channel state information-reference signal (CSI-RS) antenna port, and/or, a demodulation reference signal (DMRS) antenna port.

15. A communication method, comprising:
receiving a beam synchronization signal from a network device and receiving signaling from the network device, wherein the signaling indicates a quasi co-location (QCL) relationship between a reference signal antenna port of a first reference signal and first QCL beam information, the first reference signal received on first frequency domain location of a plurality of frequency domain locations, the first QCL beam information being one of a plurality of pieces of QCL beam information, the first reference signals on the first frequency domain location corresponding to the first QCL beam information and a second reference signal on a second frequency domain location of the plurality of frequency domain locations corresponding to a second QCL beam information of the plurality of pieces of QCL beam information;
determining, based on the received signaling, the first QCL beam information and a large-scale property of the reference signal antenna port of the first reference signal on the first frequency domain location based on the first QCL beam information corresponding to the first frequency domain location and the beam synchronization signal; and
receiving, the first reference signal on the first frequency domain location and on the reference signal antenna port based on the determined large-scale property of the reference signal antenna port of the first reference signal.

16. The method according to claim 15, wherein the first QCL beam information comprises at least one group of first QCL beam information; and the signaling is radio resource control (RRC) signaling.

17. The method according to claim 15, wherein the first QCL beam information is indicated by information included in non-zero power channel state information reference signal configuration information.

18. A non-transitory storage medium, configured to store instructions, which, when executed by a processor, cause the processor to perform steps comprising:
receiving a beam synchronization signal from a network device and receiving signaling from the network device, wherein the signaling indicating a quasi co-location (QCL) relationship between a first reference signal and first QCL beam information, the first reference signal being to be received on first frequency domain location of a plurality of frequency domain locations, the first QCL beam information being one of a plurality of pieces of QCL beam information, the first reference signal on the first frequency domain location corresponding to the first beam identifier information and a second reference signal on a second frequency domain location of the plurality of frequency domain locations corresponding to a second QCL beam information of the plurality of pieces of beam identifier information, and the first QCL beam information comprises beam identifier information associated with the received beam synchronization signal;
determining, based on the received signaling, the first QCL beam information and determine a large-scale property of the reference signal antenna port of the first reference signal based on the first QCL beam information and the beam synchronization signal; and
receiving, the first reference signal on the first frequency domain location and on the reference signal antenna port based on the determined large-scale property of the reference signal antenna port of the first reference signal.

19. The method according to claim 15, wherein the reference signal antenna port comprises a channel state information-reference signal (CSI-RS) antenna port and the reference signal is a CSI-RS.

20. The method according to claim 15, wherein the reference signal antenna port is a demodulation reference signal (DMRS) antenna port and the reference signal is a DMRS;
- wherein the first QCL beam information comprises at least one group of first QCL beam information;
- wherein the signaling comprises radio resource control (RRC) signaling; and
- wherein the method further comprises:
- receiving, from the network device, an indication indicating one group of the at least one group of first QCL beam information; and
- determining the group of first QCL beam information based on the received indication.

21. The non-transitory storage medium according to claim 18, wherein the instructions further cause the processor to perform steps comprising:
- determining the large-scale property of the reference signal antenna port based on the determined QCL beam information, wherein the large-scale property comprises one or more of: a delay spread, a Doppler spread, a Doppler frequency shift (Doppler shift), an average channel gain (average gain), an average delay, an angle of arrival (AOA), an angle of arrival spread (AAS), an angle of departure (AOD), an angle of departure spread (ADS), a spatial reception parameter (spatial RX parameters), or a spatial correlation (spatial correlation).

* * * * *

UNITED STATES PATENT AND TRADEMARK OFFICE
CERTIFICATE OF CORRECTION

PATENT NO. : 11,128,349 B2
APPLICATION NO. : 16/288823
DATED : September 21, 2021
INVENTOR(S) : Wang et al.

Page 1 of 1

It is certified that error appears in the above-identified patent and that said Letters Patent is hereby corrected as shown below:

On the Title Page

Applicant (71): "HUAWEI TECHNOLOGIES CO., LTD., Guangdong (CN)" should read
-- HUAWEI TECHNOLOGIES CO., LTD., Shenzhen (CN) --.

Signed and Sealed this
Fifth Day of July, 2022

Katherine Kelly Vidal
*Director of the United States Patent and Trademark Office*